May 20, 1941.   F. O. ALBERTSON   2,242,877
ABRASIVE DISK AND METHOD OF MAKING THE SAME
Filed March 15, 1939   2 Sheets-Sheet 1
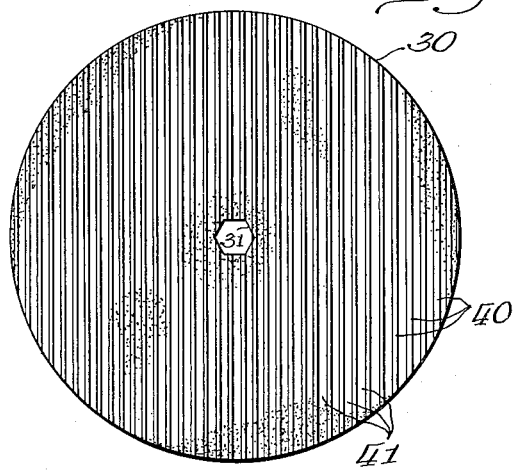
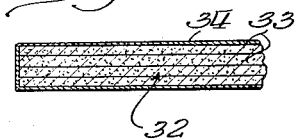
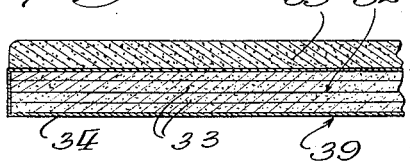
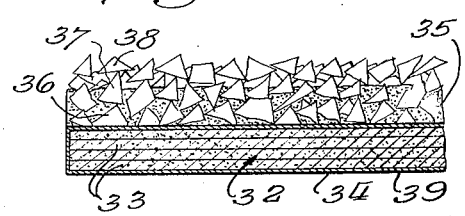
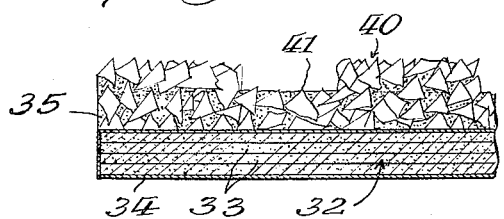
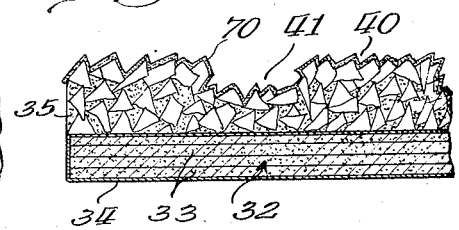
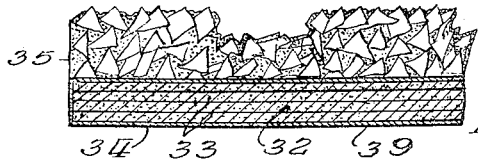
Inventor.
Frank Osborn Albertson
By
Williams, Bradbury, McCaleb & Hinkle
Attys.

May 20, 1941.   F. O. ALBERTSON   2,242,877
ABRASIVE DISK AND METHOD OF MAKING THE SAME
Filed March 15, 1939   2 Sheets-Sheet 2
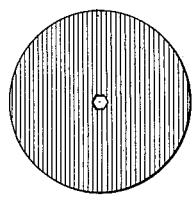
Fig. 8.
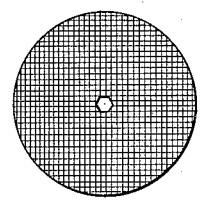
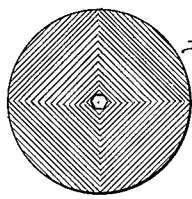
Fig. 15.
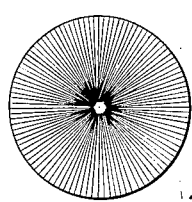
Fig. 9.
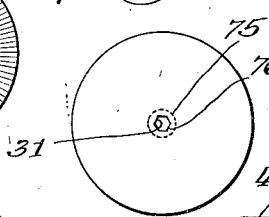
Fig. 17.
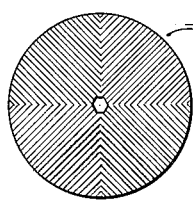
Fig. 16.
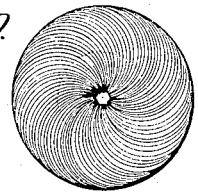
Fig. 10.
Fig. 25.
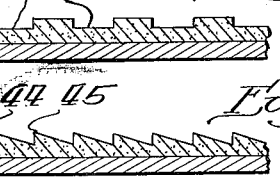
Fig. 18.
Fig. 19.
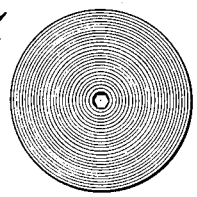
Fig. 11.
Fig. 20.
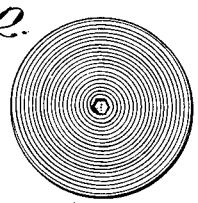
Fig. 12.
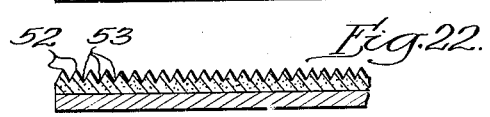
Fig. 21.
Fig. 22.
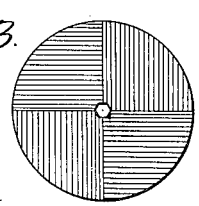
Fig. 13.
Fig. 23.
Fig. 24.
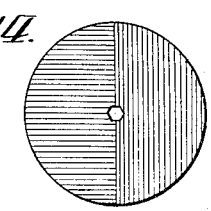
Fig. 14.
Inventor:
Frank Osbern Albertson
By
Williams, Bradbury, McCaleb & Hinkle
Attys.

Patented May 20, 1941

2,242,877

UNITED STATES PATENT OFFICE 2,242,877

ABRASIVE DISK AND METHOD OF MAKING THE SAME

Frank Osbern Albertson, Sioux City, Iowa, assignor to Albertson & Company, Inc., Sioux City, Iowa, a corporation of Iowa Application March 15, 1939, Serial No. 261,916

10 Claims. (Cl. 51—293)

The present invention relates to abrasive disks and methods of making the same, and the present application is a continuation-in-part of my prior application, Serial No. 242,249, on Abrasive disk, means, and methods of making the same, filed November 25, 1938.

The invention relates particularly to abrasive disks of the type adapted to be utilized on abrasive machines exemplified in the prior patent of F. O. Albertson, No. 2,123,222, issued July 12, 1938, and on supporting pads of the type exemplified in Patent No. 2,132,917, of F. O. Albertson, issued October 11, 1938.

One of the objects of the invention is the provision of an improved abrasive disk which is adapted to withstand any temperatures to which it might be subjected in the most difficult types of work, and which is also adapted to withstand damage by water or other liquids, such as oil or acids, with which the sanding disk may come in contact.

Another object of the invention is the provision of an improved sanding disk which is so constructed that it is completely temperature and water resistant, and in which the abrasive is most effectively arranged to produce an easy cutting action.

Another object of the invention is the provision of an improved sanding disk which is adapted to accomplish all of the foregoing objects, which is also durable, economical, efficient, capable of long use without gumming or other deterioration, and adapted to be manufactured at a lower cost than the devices of the prior art.

Another object of the invention is the provision of an improved method of making such sanding disks, by means of which great savings are effected in the amount of labor required, the amount of machinery required, the amount of abrasive used, and the amount of ingredients wasted.

Another object of the invention is the provision of an improved abrasive disk in which the free moisture content is stabilized and the abrasive disk is unaffected by external moisture conditions to which it is subjected after its completion.

Another object of the invention is the provision of an improved abrasive disk structure so constructed that the amount of contact area between the abrasive disk and the work piece is diminished so as to make the disk cut more effectively, and which is also provided with suitable clearance spaces so that the cuttings may be thrown off and there will be no loading of the disk, under certain conditions.

Another object of the invention is the provision of an abrasive disk structure having a supporting base, which is substantially homogeneous in all of the layers thereof so that there is no unequal expansion of the various layers of the disk tending to cause a curling of the disk under different humidity conditions.

Another object of the invention is the provision of an improved abrasive disk which is substantially flat in its completed condition and which is characterized by the absence of the curling which is present in the disks of the prior art now on the market, so as to eliminate the uneven abrasive action which is caused by the curled disk, which has two high portions projecting from the abrading surface thereof, even when the curled disk is clamped at the middle.

Another object of the invention is the provision of an improved abrasive disk structure which is adapted to be form-set in its manufacture, so as to assure the production of a substantially flat backing, and which also is adapted to permit the escape of the gas from the various disks during the form curing, by virtue of the clearance spaces on the face of the disk.

Another object is to provide an improved abrasive disk structure adapted to be modified readily with ordinary tools, to fit spindles of various sizes.

Other objects and advantages of the invention will be apparent from the following description and the accompanying drawings, in which similar characters of reference indicate similar parts throughout the several views.

Referring to the drawings, of which there are two sheets,

Fig. 1 is a plan view of an abrasive disk, taken from the abrasive side thereof, constructed according to the invention;

Fig. 2 is a fragmentary side elevational view of the backing for the disk, shown at the time when it has been impregnated with a suitable phenolic condensation compound;

Fig. 3 is a similar fragmentary sectional view, showing the backing in the next step of its manufacture, with the binder layer applied thereto;

Fig. 4 is a similar sectional view, showing a portion of the disk after the abrasive particles have been applied thereto, in a layer, and after they have been pressed into the binder;

Fig. 5 is a similar view of a portion of the abrasive disk in a subsequent step of its manufacture, after the excess abrasive particles have been shaken off and the abrasive surface has been given a predetermined shape, by means of suitable dies;

Fig. 6 is a similar view of a portion of an abrasive disk in a subsequent stage of manufacture, after which a final anchoring layer of binder compound has been applied thereto, by means of spraying, for covering the major portions of the abrasive particles and locking them to the binder and backing;

Fig. 7 is a similar view of a portion of an abrasive disk as it appears after the anchoring or locking coat has been worn off the projecting points or cutting edges of the abrasive particles so as to put the abrasive disk in condition for the most effective operation;

Figs. 8 to 17 are diagrammatic plan views of abrasive disks showing diagrammatically the patterns for various types of abrading formations on the surfaces of the abrasive disks, the abrading formations taking the form of the sections in Figs. 18–24;

Figs. 18–24 are diagrammatic fragmentary sectional views of portions of abrasive disks showing the sectional conformation of the toothed formations which may be utilized on abrasive disks according to my invention, and any of these toothed formations may be utilized with any of the line patterns shown in Figs. 8–16;

Fig. 25 is a rear plan view of the abrasive disk.

Referring to Figs. 1 to 7, the abrasive disks to which the invention relates comprise circular members 30, preferably provided with a non-circular aperture 31, located at the center thereof, for receiving the threaded securing member, which is of complementary hexagonal shape, and which secures the disk to a supporting pad of the type shown in the prior Patent No. 2,132,917 of F. O. Albertson, issued October 11, 1938.

The disks are made in various standard sizes, such as five inch, seven inch, nine inch, etc., but may be made in any size desired. As the face of the disc adjacent the periphery is that which is used most, it is customary to trim down a disk after that portion of the face has been worn out, and utilize it on the smaller supporting pad. Thus a nine inch disk may subsequently be trimmed down to a smaller size, such as seven inch, and used again, and thereafter trimmed down to a five inch, to be used once more.

While the hexagonal aperture 31 is adapted to fit the securing device on the supporting pads of Albertson Patent No. 2,132,917 previously mentioned, I prefer to make the abrasive disks in such manner that they will fit pads requiring a larger or a round aperture also.

For example, some tools on the market have a one-half inch, round spindle. By making the hexagon aperture one-half inch wide from one flat edge to the opposite edge, this disk is also adapted to be used on a one-half inch round spindle.

There are other machines in use and for sale which have a ⅞ inch round spindle. Many users of disks may have two or more machines with spindles of different size. According to the prior art practices, such users must carry two stocks of disks having suitable apertures of proper size.

Referring to Fig. 25, one of my disks is here shown in plan from the rear side. In addition to the aperture 31, each disk may have its backing provided with a partially cut or slotted circle 75, surrounding the aperture 31.

The slits may be made after the disk has been impregnated and before applying the binder and abrasive, or they may be made after the disk is completed. In either event, slits are not such as to sever or perforate the backing, but merely to weaken it. The slits are thus not visible on the face of the disk.

With this construction my disk is adapted to be modified easily to fit practically all standard machines. If a larger spindle hole is needed, a screw driver may be applied at the slits to push out a part of the annulus 76; then the tapered screw driver handle may be forced into the aperture 75 and twisted to effect complete severance of the annular portion 76, at the slits and to produce a larger hole.

It should be understood that the dimensions given are merely exemplary and various sizes of holes may be used. As the central part of the disk is held under the head of the spindle or securing member, there is no chance of the slits tearing when used with the smaller spindle. The head may overlap the slits 75 and engage parts of the disk which have not been weakened by slits.

The abrasive disks preferably comprise a backing or supporting member 32, consisting of fiber sheets or fiber board, quite generally known in the trade as fiber board or vulcanized fiber. Such fiber board comprises a plurality of thin sheets of cellulosic material, united to form a single sheet.

The thin sheets preferably comprise unsized cotton cellulose paper, which has been subjected to the action of a suitable chemical, such as zinc chloride, for the purpose of effecting a partial hydration. The zinc chloride is placed in solution by means of a suitable solvent, and the paper sheets may be passed through the solution, having the strength of about 70 Baumé, and at a temperature range from ordinary room temperature to about 35 degrees C.

The hydrated fibers in sheet form are then compressed to give a good bonding, between plies of paper, by means of conducting the sheets from the solution to heated drums or cylinders, where heat and pressure effects a bonding between the plies. The excess zinc chloride is then leached out, and the material is suitably dried, and the resulting fiber board is approximately 90 percent cellulose and 3 percent ash.

The fiber board is a form of high grade rag content cardboard, which is relatively stiff, yet capable of flexing, to permit the flexing of the abrasive disk when it is applied to a flexible pad.

Such fiber board may be purchased upon the open market from various fiber companies, in flat sheets.

In the manufacture of my abrasive disks, the fiber sheets are first cut into disks of suitable size and provided with the centrally located apertures 31. The fiber board in the form of disks or sheets may then be subjected to the step of reducing the free moisture content by storing the disks or sheets in the drying atmosphere of a room of controlled humidity, and I prefer to reduce the free moisture content in the fiber board to a minimum.

Thereafter the fiber board disks are first impregnated with a phenolic resin impregnating compound, which may be applied by spraying the back side and the front side, or by dipping the disks into a suitable solution. If sprayed, the phenolic resin compound should be thinned sufficiently to effect a spraying action, such as by means of 50 percent solvent. Any suitable solvent may be employed, such as, for example, alcohol. Where the fiber board disks are dipped, the solution need not be thinned as much as where they are sprayed.

Various types of phenolic condensation resins may be employed for impregnating the disks, but I prefer to use the same phenolic condensation resin for the impregnation of the disk and as a binder for the abrasive grains, except that different concentrations of the solution may be employed for these different purposes.

For example, the phenolic condensation resin may consist of a colloidal solution of resin, of one of the types disclosed in Letters Patent No. 1,854,600, issued April 19, 1932, to Fritz Pollak and Alphons Ostersetzer.

Due to the preliminary step of the reduction of the free moisture content of the fiber board, the impregnation of the disks with the phenolic resin condensation compound, either by spraying or dipping, is greatly expedited, as the relatively dry fiber board tends to take up the impregnating solution with great facility.

The impregnated disks, which are shown diagrammatically in Fig. 2 as having a plurality of laminations of paper 33, impregnated with the resin and covered with an external coat 34 at the top and bottom and the edges thereof, are next subjected to a slow heating operation at a temperature of approximately 175 degrees F., for the purpose of stabilizing the moisture condition of the fiber and for evaporating the solvent of the resin compound, such as the alcohol.

The external layer 34 of the impregnating compound serves, on the front side of the disk, to provide a firm bond between the binder of similar composition and the disk, due to the cohesion of the particles of the resinous compound, which also extend into the fibers of the fiber board.

The layer of impregnating compound at the edge of the disk serves to waterproof the edge of the disk against access of moisture to the laminations 33 of the disk backing, and the impregnation of the fibers of the laminations 33 also serves to exclude additional moisture and to seal into the backing the moisture and other content of the cellulosic fibers, which are stabilized in so far as the influence of moisture and other liquids is concerned.

The layer 34 of impregnating compound on the back of the disk serves to provide the back of the disk with a smooth and bright surface and, if desired, an additional coating of the impregnating resinous compound may be used on the back or under side of the disk, and it may be subjected to pressure and calendering action of heated rollers, to give it a smooth, shiny surface. Such a back surface is capable of withstanding high temperatures, and the action of water and other liquids, without any possibility of deterioration of the fibers of the backing. The smooth, shiny back also presents a better appearance and increases the salability of the disks, and the disks are more easily kept clean than when provided with a rough canvas or fiber surface on the back side, as is the case in the devices of the prior art.

The front side of the disc is then coated by means of rollers dipping in the binder, with a layer of thick phenolic condensation resin binder, preferably of the same composition as the impregnating compound, but in a different and suitable concentration of solution. For example, approximately 15 percent of alcohol may be added to the resin in order to thin it suitably for application to the disk as a binder, by means of rolling.

The next step in the manufacture of abrasive disks is the application of a thick layer of abrasive particles so that an excess of abrasive is applied to the binder 35. For example, a layer one-half inch thick may be applied to the binder. Pressure may be applied to these abrasive particles by means of a roller to embed the abrasive particles in the resin binder, while the resinous layer 35 is in an adhesive or tacky condition.

Some of the abrasive is thus caused to sink down into the resinous layer, while others lie with their surfaces disposed at the top side of the disk at this time, and the excess may be supported loosely on top, as shown in Fig. 4. For example, the abrasive particles 36 are fully embedded, 37 partially embedded, and 38 are loose.

Other methods of application of the abrasive particles are by blowing or spraying the abrasive particles against the binder by compressed air and a nozzle, or by having the abrasive particles drop from a predetermined height so that they require a predetermined velocity to effect an embedment of the particles in the binder.

The abrasive particles may be of any standard type, and are usually furnished in the form of slivers, angles, or squares. For example, the blocky, treated type of "Borolon" grain is preferred. Such grains comprise oxide of aluminum, which is crystallized by fusing bauxite in the intense heat of the electric furnace by what is known as the "arc process."

The basic materials used in this process are bauxite, petroleum coke, and iron borings or filings. The bauxite is a natural hydrated alumina, consisting of 30 percent to 70 percent $Al_2O_3$ and 8 percent to 30 percent water with $Fe_2O_3$, $SiO_2$ and $TiO_2$ as impurities.

The characteristics of such abrasive particles are as follows: The hardness (Moh's scale) varies from 9.2 to 9.6. The specific gravity varies from 3.92 to 4.01. The approximate chemical analysis of "Borolon" is:

| | Percent |
|---|---|
| $Al_2O_3$ | 94.60 |
| $Fe_2O_3$ | 0.50 |
| $SiO_2$ | 1.25 |
| $TiO_2$ | 3.75 |

Thereafter, the disk may be subjected to edge impact for the purpose of causing the excess abrasive particles 38 to drop off, leaving the embedded particles 36 and 37 secured to the backing 32 by the binder 35.

The abrasive disks are next subjected to a pressure operation by means of a flat supporting surface for the back 39, and a suitable die for the abrasive side, the die having predetermined formations for shaping the abrasive surface of the disk. For example, the disk shown in Fig. 1 has a plurality of ribs 40 and grooves 41 formed therein, the ribs or ridges preferably being wider than the grooves, in order to increase the amount of working surface in the plane of the ridges 40.

In some embodiments of the invention, however, the ridges may be made narrower than the grooves or equal in width to the grooves, and in Figs. 18-24 there are diagrammatically shown a number of different formations of ribs, grooves, etc., which may be utilized. For example, Fig. 18 shows ribs 40 and grooves 41 of substantially the same size, the shape of the ribs and grooves being approximately rectangular.

In Fig. 19, the grooves are formed by the diagonally and downwardly extending surface 43 and by the vertically extending shoulder 44, so as to give the abrasive the general formation of sharp teeth, having edges 45.

In Fig. 20 the ridges 46 are substantially circular in cross section, while the base of the grooves 47 are substantially plane.

In Fig. 21 the ridges are formed by a pair of sloping surfaces 48, 49, coming to a sharp point 50, and the grooves are provided with plane surfaces 51.

Fig. 22 shows a saw tooth formation in which the ridges 52 are triangular, and the grooves 53 are of similar shape.

Fig. 23 shows a modified form of construction, in which the backing 32 is itself formed with outwardly projecting ribs 54, which, when coated with a uniform layer of binder and abrasive 55, provides the disk with the ridges 56 and grooves 57 of rectangular shape.

Fig. 24 shows a corrugated form of backing 58 provided with the ridges 59 and depressions 60 in the form of wavy corrugations, which may be covered by the uniform layer of abrasive and binder 61, to provide a disk of the shape shown.

It should be understood that in every one of these cases the die used has its ridges and grooves of complementary shape to the shape of the disk shown in Figs. 18–24. The last two figures, 23 and 24, show embodiments which may be made in some cases without the use of a die.

While Figs. 18–24 show the shape of the ridges and grooves or teeth and depressions, Figs. 8–17 show the pattern or direction in which these ridges and grooves run on the disk, and on the die which is used to form the ridges and depressions.

Fig. 8 shows a pattern corresponding substantially to Fig. 1, in which the ridges and grooves extend parallel to each other across one diameter of the disk and over the remainder of the surface of the disk.

Fig. 9 shows a pattern in which the ridges and grooves extend radially from the center outward to the periphery of the disk, thus placing the ridges in the same operating direction for every part of the disk, during its rotation.

In this embodiment every ridge or tooth of the disk extends transversely to the direction of rotation of the disk.

In the embodiment of Fig. 10 the ridges and grooves extend radially, but are curved on the line of a circle, the center of which is located half way between the center of the disk and its periphery. This gives the ridges a tangential direction at the edge of the disk, which curves toward the radial direction at the center, and facilitates a slicing action of the ridges on the abrasive disk.

Fig. 11 shows another modification in which the ridges and grooves extend concentrically of the disk, with the center of the disk as the center of the ridges and grooves. In this embodiment it might be assumed that a grooving action of the disk would be the result of the rotation of the disk, but, as a matter of fact, such disks are not held in fixed position, but are caused to move back and forth as the disk rotates, with a wiping action.

This wiping action of the machine as the disk rotates gives the concentric ridges a slicing action which facilitates the cutting and may be of great advantage in certain types of work.

Fig. 12 shows a modification in which the ridges and grooves extend spirally from the center of the disk outward toward the periphery. This embodiment has the advantage over that of Fig. 10 in that the ridges extend tangentially over a greater part of the disk so that when the disk of Fig. 12 is cut down it still has the same characteristics at parts of its surface near the edge.

Fig. 13 shows a modification of the simple type of ridge and groove formation of Fig. 8, in which the disk is divided into four quarters, with ridges and grooves extending transversely across these quarters.

The ridges of these quarters are at right angles to the ridges of the next adjacent quarter. This places the major portion of the ridges in position to effect a slicing action, and avoids the objection to the pattern of Fig. 8 that some of the ridges are transverse and some are extending in the direction of rotation of the disk, whereas the pattern of Fig. 8 is of simpler construction and involves the use of a simpler die.

Fig. 14 shows a modification in which half the ridges extend in one direction and the other half of the ridges extend in a direction at right angles to the first-mentioned ridges.

Fig. 17 shows an embodiment of the invention which is like Fig. 8, except that it has the grooves extending in both directions. This effects the formation of a plurality of what might be called "islands" or rectangular formations of abrasive projecting above the sets of grooves.

It should be understood that any of the ridge or groove formations of Figs. 18–24 may be used with any of the face patterns of Figs. 8–17, and such formations may be produced in the surface of the abrasive by means of pressure dies, the pressure being applied by means of mechanical screws, levers, or hydraulic arrangements.

This produces a product which is diagrammatically illustrated in Fig. 5, where ridges and grooves of the formation of Fig. 18 were employed in the die.

By means of the formations shown in Figs. 8–24 on the abrasive surfaces of the disks, the contact area of the disk is cut down so as to produce a higher unit pressure on the cutting edges of the abrasive particles and to effect a faster cutting. Furthermore, the grooves or relief surfaces give a clearance which is adapted to receive the cuttings and permit them to be thrown off. In the abrasive disks which have grooves terminating at the edge of the disk, it will be apparent that the cuttings may be thrown off centrifugally and radially from the open ends of the grooves, and even in the embodiments, such as Figs. 11 and 12, which are provided with concentric or spiral grooves, the grooves provide a space for cuttings, from which the cuttings are thrown off when the abrasive disk is lifted from the work, as it is frequently during its operation.

Consequently, there is no loading of the disk. If any loading results from the sanding of enamel, it soon dries out, due to the heat which is produced, and as it dries out it flies off, due to the rotation of the disk. If any enamel seems to lodge in the grooves, a few applications of the disk to a steel surface, such as a spot already cleaned on a fender, causes such heat that the enamel in the grooves is immediately dried and becomes brittle and flies off by centrifugal force.

After the ribs and grooves have been formed, the next step in the manufacture of the disks comprises the spraying of another layer of phenol resin, diluted by alcohol or other suitable solvent, to cover the grains and anchor them to the disk. For example, the solution in this case may consist of 50% resin and 50% alcohol, and the solution is preferably applied by spraying in order that the grains of abrasive may be covered and anchored without filling the grooves.

This resin must not be too tough or hard because it must wear off the exposed edges of the abrasive particles in order that they may perform the cutting action. The cap on the grains wears off quickly in the first use of the disk, but the remainder of this layer of resin, indicated by the numeral 70 in Fig. 6, remains as shown in Fig. 7, to cover all of the exposed portions of the abrasive particles except the outermost points.

Fig. 6 shows the abrasive disk surface in a state which may be termed a state of completion, preliminary to the wearing off of the caps of the final coating of resin.

In this embodiment of the invention, the abrasive disk may be subjected to an initial use or breaking in operation, for the purpose of wearing off the caps of the abrasive prior to the sale of the disk, in which case the abrasive disk may be diagrammatically illustrated by Fig. 7.

In other embodiments of the invention it may be preferred to keep the cap or final coating on the outermost cutting edges of the abrasive particles, as shown in Fig. 6, so as to permit the handling of the disks without damage to the abrasive edges. In such case the final coating of resin would protect the cutting edges of the abrasive particles until the abrasive disks have reached the ultimate consumer and been subjected to a slight preliminary use, to wear off the caps.

The next step in the manufacture of the abrasive disks is the baking of the disks for a period of about twelve hours at a temperature of approximately 176 degrees F., for the purpose of setting the resin and driving off the major portion of the gases. During this operation the disks may be supported side by side upon a suitable plate or conveyor, or they may be stacked between flat, stiff metal plates in stacks of fifteen or twenty disks, with a plate between each disk, the plates being of the same size and shape as the disks. For example, stacks fifteen or twenty disks high might be stacked and subjected to pressure to hold the disks flat during the baking operation. Due to the grooves between the ridge formations on the faces of the disks, the gases produced by the chemical action of the resin and the evaporation of the solvent, are permitted to escape from the edges of the disks and plates. Sufficient pressure may be applied to hold the disks flat, or a plate press may be utilized for engaging the end plates.

In some embodiments of the invention the disks may be subjected to pressure and flattening action throughout the complete baking operation, and in other embodiments of the invention only the last few hours of the baking operation, may be carried out with the disks held in flat condition.

In either event, the baking with the disks in perfectly flat condition effects a setting of the resin with all parts of the disk in the same plane, and produces an abrasive disk which is flexible, but perfectly flat or plane, as distinguished from the curled disks of the prior art.

Most abrasive disks are now secured on supporting pads by means of a centrally located securing member, and no matter how tightly they are clamped, a disk which is not flat, but which is curled, will have two high points oppositely located on one diameter of the disk.

These high points cause an uneven cutting action, as the arbasive takes hold and lets go, due to the high points on the abrasive disk. It is highly desirable to produce an abrasive disk which is perfectly flat and plane.

The abrasive disks of the prior art which do not have a layer of resin protecting the backing at the edges and the back side, pick up moisture from the atmosphere and tend to straighten out. Furthermore, cloth reinforcing, which has been used in the disks of the prior art, has a different rate of expansion than fiber; when the disks of the prior art dry out, they tend to curl up.

The present disks have laminations, but the laminations in the backing are all of the same construction and do not have different rates of moisture expansion, as in the devices of the prior art. Furthermore, the form setting of the disks during the final baking makes a disk which is perfectly flat, and the preliminary drying out of the fiber eliminates most of the free moisture. Such moisture as is left in the fiber is sealed in by the layers of phenolic resin, and external moisture cannot get in after the disk has been completed, because the layer of resin at the edge and the back prevents the absorption of water there in the same manner as absorption is prevented on the front surface of the disk, by the phenolic resin.

The disks constructed according to the present method are, therefore, perfectly plane and flat, and they will not curl, because there is no absorption of water by the abrasive disk. The disk is practically a solid phenolic article, reinforced by fiber, the moisture condition of which is stabilized.

The abrasive disks are adapted to withstand high temperatures, and can be used for grinding steel or other hard metals in the same way that grinding wheels are used in the prior art, without damage to the abrasive disks.

While the phenolic condensation binder is more expensive than the glue binders and cement binders of the prior art, such a saving may be effected by my method that the better type of abrasive disks described herein may be produced at a reasonable cost. There is no waste of abrasive or of the resinous binding compound, as there is in the methods of the prior art where abrasive disks are cut out of complete abrasive sheets. The dies which cut out the fiber disks may be used for a long period of time without resharpening, or the fiber may be purchased in the form of disks, so that the manufacturer of the abrasive disks need not purchase anything but fiber in the disk form as it is to be used.

The manufacturer of the fiber disks is in a position to reclaim any wastage which is made by the cutting of the fiber into disks, and can give a more reasonable price on fiber disks, due to the fact that the fiber which is cut off the edges of the disks may be reclaimed.

The apparatus required for carrying out my method may be installed in a very small space, compared to the apparatus of the prior art used for manufacturing abrasive sheets, and there is no waste of the finished abrasive material because all of the disks may be supported in flat position so there are no bent portions to be wasted, as is the case where sheets are hung in loops.

My prior application, previously mentioned, discloses a machine which is capable of coating abrasive disks and impregnating them at a high speed, and the present methods may be carried out by the apparatus, which represents a very small investment as compared with the manufacturing plants of the prior art for making abrasive in large sheets.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An abrasive disk comprising a backing of fiber board having a plurality of laminations of substantially the same characteristics, said disk having substantially all of its free moisture eliminated and being impregnated with a phenolic condensation resin, and having its back, edges and face sealed with a coating of phenolic resin, and a layer of abrasive particles carried by the face of said disk, and secured thereto by a binder of the same phenolic resin, whereby the structure of the abrasive disk is substantially homogeneous and adapted to maintain its preliminary set without being affected by external moisture conditions, the phenolic resin coating over all parts of the backing of said disk effectively sealing the fiber of the backing in a stabilized moisture condition.

2. An abrasive disk comprising a backing of fiber board having a plurality of laminations of substantially the same characteristics, said disk having substantially all of its free moisture eliminated and being impregnated with a phenolic condensation resin, and having its back, edges and face sealed with a coating of phenolic resin, and a layer of abrasive particles carried by the face of said disk, and secured thereto by a binder of the same phenolic resin, whereby the structure of the abrasive disk is substantially homogeneous and adapted to maintain its preliminary set without being affected by external moisture conditions, the phenolic resin coating over all parts of the backing of said disk effectively sealing the fiber of the backing in a stabilized moisture condition, the abrasive surface of said disk being provided with a plurality of predetermined grooves and raised portions providing a reduced contact cutting area and a clearance for cuttings on the face of said disks, the said grooves having their openings terminating at the edge of the disk whereby the grooves permit cuttings lodged in said grooves to fly out from said grooves at the edges of said disk.

3. An abrasive disk comprising a backing of fiber board having a plurality of laminations of substantially the same characteristics, said disk having substantially all of its free moisture eliminated and being impregnated with a phenolic condensation resin, and having its back, edges and face sealed with a coating of phenolic resin, and a layer of abrasive particles carried by the face of said disk, and secured thereto by a binder of the same phenolic resin, whereby the structure of the abrasive disk is substantially homogeneous and adapted to maintain its preliminary set without being affected by external moisture conditions, the phenolic resin coating over all parts of the backing of said disk effectively sealing the fiber of the backing in a stabilized moisture condition, the abrasive surface of said disk being provided with a plurality of predetermined grooves and raised portions providing a reduced contact cutting area and a clearance for cuttings on the face of said disks, said grooves extending transversely to each other in at least two directions on said disk, to effect a formation of a multiplicity of raised abrasive cutting members spaced by depressed portions on the face of the disk.

4. An abrasive disk comprising a backing of fiber board having a plurality of laminations of substantially the same characteristics, said disk having substantially all of its free moisture eliminated and being impregnated with a phenolic condensation resin, and having its back, edges and face sealed with a coating of phenolic resin, and a layer of abrasive particles carried by the face of said disk, and secured thereto by a binder of the same phenolic resin, whereby the structure of the abrasive disk is substantially homogeneous and adapted to maintain its preliminary set without being affected by external moisture conditions, and a layer of the same phenolic resin forming a substantially uniform coating on the external surface of the abrasive grains for the purpose of anchoring the abrasive grains more firmly to the binder.

5. The method of making abrasive disks which comprises subjecting a fiber backing having laminations of substantially uniform characteristics to a drying atmosphere to remove substantially all the free moisture, impregnating the fiber while in this condition with a phenolic resin impregnating compound, and coating both faces and the edge of said disk with said compound to seal the backing in a stabilized moisture condition, applying a phenolic resin binder in a tacky condition to one surface of said disk, and applying an excess of abrasive particles to said binder, said particles being subjected to sufficient pressure to embed them firmly in the binder.

6. The method of making abrasive disks which comprises subjecting a fiber backing having laminations of substantially uniform characteristics to a drying atmosphere to remove substantially all the free moisture, impregnating the fiber while in this condition with a phenolic resin impregnating compound, and coating both faces and the edge of said disk with said compound to seal the backing in a stabilized moisture condition, applying a phenolic resin binder in a tacky condition to one surface of said disk, and applying an excess of abrasive particles to said binder, said particles being subjected to sufficient pressure to embed them firmly in the binder, and subjecting said abrasive disk with its binder in semi-plastic condition to pressure of a die of predetermined form to provide the abrasive surface with a plurality of grooves and ridges.

7. The method of making abrasive disks which comprises subjecting a fiber backing having laminations of substantially uniform characteristics to a drying atmosphere to remove substantially all the free moisture, impregnating the fiber while in this condition with a phenolic resin impregnating compound, and coating both faces and the edge of said disc with said compound to seal the backing in a stabilized moisture condition, applying a phenolic resin binder in a tacky condition to one surface of said disk, and applying an excess of abrasive particles to said binder, said particles being subjected to sufficient pressure to embed them firmly in the binder, and subjecting said abrasive disk with its binder in semi-plastic condition to pressure of a die of predetermined form to provide the abrasive surface with a plurality of grooves and ridges, and baking said abrasive disks to expel the solvent of the binder and impregnating compound, and effect a permanent set of said compound, said abrasive disks being held in a plane condition during at least a portion of said baking, for the purpose of setting the disks in a substantially plane condition.

8. The method of making abrasive disks which comprises subjecting a fiber backing having laminations of substantially uniform characteristics to a drying atmosphere to remove substantially all the free moisture, impregnating the fiber while in this condition with a phenolic resin impregnating compound, and coating both faces and the edge of said disk with said compound to seal the backing in a stabilized moisture condition, applying a phenolic resin binder in a tacky condition to one surface of said disk, and applying an excess of abrasive particles to said binder, said particles being subjected to sufficient pressure to embed them firmly in the binder, and subjecting said abrasive disk with its binder in semi-plastic condition to pressure of a die of predetermined form to provide the abrasive surface with a plurality of grooves and ridges, and baking said abrasive disks to expel the solvent of the binder and impregnating compound, and effect a permanent set of said compound, said abrasive disks being held in a plane condition during at least a portion of said baking, for the purpose of setting the disks in a substantially plane condition, the said grooves and ridges permitting the expulsion of gas from all parts of the faces of the disks during the form-setting of the disks.

9. A non-curling abrasive disk, comprising a backing of indurated fiber having substantially all of its free moisture removed, the said backing being impregnated with a phenol-resin compound, and having both faces and edges sealed with said compound to provide a backing of substantially stable moisture conditions adapted to withstand moisture and other liquids, a binder of phenol-resin compound of the same composition, but of a tacky nature, and abrasive grit secured to said backing by said binder, the said grit being pressed into said binder, into close engagement with the backing, and the surface of the grit being formed with a plurality of ridges separated by grooves, and an anchoring layer of the same phenolic condensation resin compound in a more dilute state, sprayed on the abrasive face of said disk for anchoring all of the grit firmly to the binder, the said disk having its phenol-resin compound set to an infusible but flexible condition by the application of heat while the disk is held in a plane condition.

10. An abrasive disk comprising a laminated backing of fibrous material, having substantially all of its free moisture eliminated therefrom, said backing being impregnated with a resinous compound insoluble in water, and having its back, edges, and face sealed with a coating of said resin, a layer of adhesive, including the same resin, carried by a face of said disk, and a layer of abrasive particles embedded in said adhesive, the abrasive particles and adhesive layer being shaped to predetermined form with a plurality of ridges and grooves extending transversely to another series of ridges and grooves, and an anchoring layer of the same adhesive engaging the outer portions of said abrasive particles and securing them to the adhesive layer.

FRANK OSBERN ALBERTSON.